Dec. 9, 1958  W. J. CRAVEN ET AL  2,863,201
EJECTOR SNAP HOOK
Filed July 7, 1953  2 Sheets-Sheet 1
FIG.1
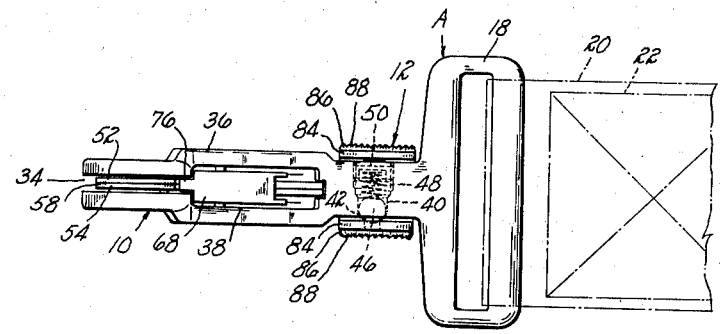
FIG.2
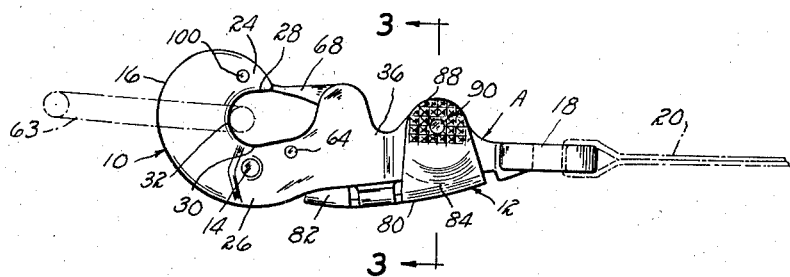
FIG.3
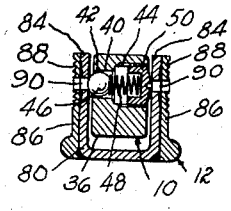
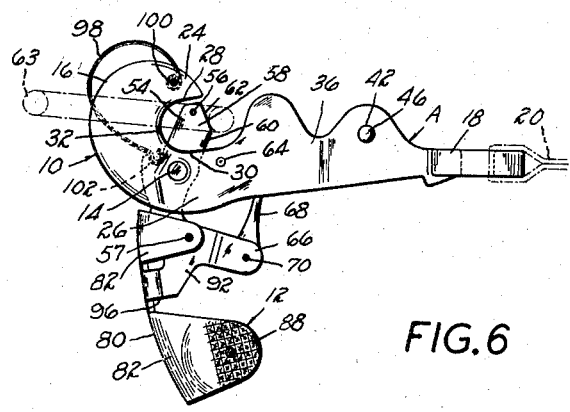
FIG.6
INVENTORS
WILBUR J. CRAVEN
BY ALDEN Y. WARNER
*Lindsey and Prutzman*
ATTORNEYS Dec. 9, 1958  W. J. CRAVEN ET AL  2,863,201
EJECTOR SNAP HOOK Filed July 7, 1953  2 Sheets-Sheet 2

INVENTORS
WILBUR J. CRAVEN
BY ALDEN Y. WARNER

Lindsey and Prutzman
ATTORNEYS

United States Patent Office 2,863,201
Patented Dec. 9, 1958

2,863,201

EJECTOR SNAP HOOK

Wilbur J. Craven, East Hartford, and Alden Y. Warner, Farmington, Conn., assignors to The Capewell Manufacturing Company, Hartford, Conn., a Connecticut corporation Application July 7, 1953, Serial No. 366,403

8 Claims. (Cl. 24—233)

The present invention relates in general to hooks or clasps, and pertains more particularly to a snap hook of the ejector type having especial utility in conjunction with parachute harnesses and the like.

One object of the instant invention is to provide an ejector snap hook which is of low cost and lightweight construction, yet possessing an exceptionally high strength and degree of reliability, thereby rendering the hook unit particularly useful for parachute connections, for example, where both weight and safety are controlling factors.

More specifically, an aim of the invention is to provide an ejector snap hook that will not open inadvertently to release the member held by the hook. In this connection, it is a desideratum of the invention to devise an ejector snap hook having positive means for retaining the hook closed, irrespective of the direction of loading. Also, it is within the purview of the invention to so construct the ejector snap hook and arrange the cooperating parts thereof in such a manner that there is little likelihood that such parts will ever catch on the user's clothing or other objects with which conventional hooks have been prone to become entangled.

Another object of the invention is to provide an ejector snap hook equipped with a guard which will permit introduction of the link, ring or other member to the hook automatically upon the application of only a slight amount of pressure.

Another object is to provide an ejector snap hook equipped with a guard effectively resisting deflection thereof in a lateral direction should the load shift in such a way that the entire load must be borne by the guard element.

A further object of the invention is to provide a hook assemblage of the foregoing character which will eject completely any link, ring, shroud line or the like contained in the hook concomitantly with the release of such contained element. In this respect, it is an additional aim to provide facile means for effecting the release of any such element when desired, but which means prevents any accidental release thereof.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

Figure 1 is a plan view of the ejector snap assembly;

Figure 2 is an elevational view corresponding to Figure 1;

Figure 3 is a sectional view taken in the direction of line 3—3 of Figure 2;

Figure 6 is a view corresponding to Figure 4, but with the release lever arm in a fully opened condition.

Figure 4:
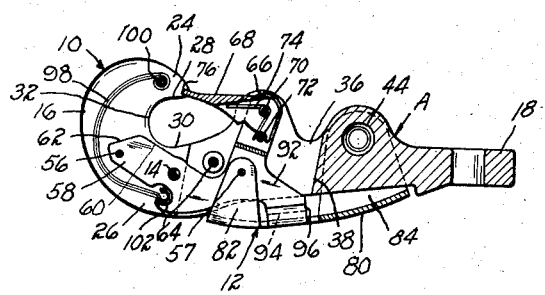
Figure 4 is a longitudinal sectional view taken through the center of Figure 1.
Figure 5:
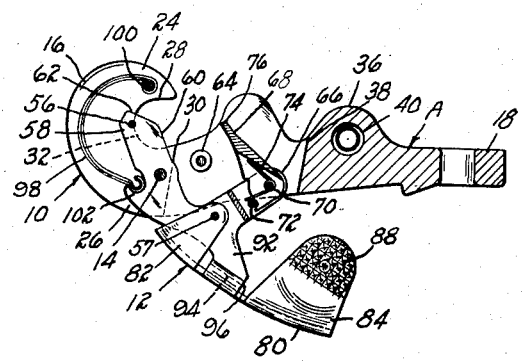
Figure 5 is a view corresponding to Figure 4, but with the release lever arm in a partially opened condition.

Referring to the drawings, the ejector snap hook there exemplified and designated in its entirety by the letter A comprises a hook body 10 and a release lever arm 12 pivotally connected thereto by means of a pivot pin 14.

Describing first the body 10 in detail, this body is preferably constructed of forged steel, having a hook 16 at one end and a belt engaging loop 18 at the other, in actual use a portion of a belt or strap 20 pictured in phantom outline being suggestively threaded through the loop and stitched upon itself at 22. When viewed in elevation it will be observed that the hook is essentially U-shaped, having a pair of spaced legs 24 and 26 provided with substantially straight, parallel opposed edges 28 and 30, the legs being connected with a curved bight designated by the reference numeral 32. For the purpose of pivotally accommodating the lever arm 12, the hook end 16 of the body 10 is slotted at 34 and its shank 36, connecting the hook end 16 with the loop end 18, is apertured at 38, the communicating slot and aperture being easily formed in the otherwise solid body stock, as by milling out the material to be removed.

In the solid region of the shank 36 lying immediately adjacent the juncture of the shank 36 and loop 18 is a transverse bore 40 provided with a seat 42 at one end and an enlarged counterbore 44 at the other. Contained within the bore 40 is a ball member 46, the ball being of such a size as to engage the seat 42, but small enough so that a portion thereof will protrude outwardly therethrough. Biasing the ball 46 against the seat is a coil spring 48, one end of which abuts the ball 46 and the other end of which is constrained by a convex head cap screw 50 threaded into the counterbore 44. Briefly, the ball 46 and spring 48 constitute spring pressed detent means for retaining the release lever arm 12 in one of its extreme positions, as shown in Figures 1, 2 and 4.

With respect to the specific construction of the release lever arm 12, this arm may be fabricated from several individual elements. Two identical parts 52 and 54 are riveted together at 56 and 57, and the foremost end portion of the assemblage constitutes an ejector 58 provided with intersecting sloping edges 60 and 62 serving the function of camming out whatever element, such as a link or ring 63 shown in phantom outline, is received in the hook 16 when the lever 12 is moved from its closed position (Figure 4) to its open position (Figure 6). In this connection, it is to be observed that the camming edge 60 first engages the ring, link or other element 63 retained by the hook 16 during the initial pivoting of the lever 12, to move the element 63 generally longitudinally of the body member 10 toward the distal end of the hook 16. The camming edge 62 is initially engageable with the element 63 at an intermediate pivoted position of the ejector 58 to cam the element 63 generally laterally of the body member 10 and to cause complete ejectment of such element over the distal end of the hook. A stop 64 arrests further pivotal movement of the lever arm 12 when the ejector 58 is in substantial alignment with the free end of the hook leg 24 in which position of the ejector, as can be seen from Fig. 6, the cam edge 62 is disposed generally tangentially of the curved outer peripheral portion of the hook next adjacent the distal end of the hook. Also, by having the edge 60 approximately tangential to the bight 32, any member 63 contained by the hook 16 aids in preventing the release arm 12 from opening, for any tendency for this to happen is successfully overcome by the ejector 58 striking the contained member, which when under load will arrest movement of the ejector and hence the release arm.

While the sections of the parts 52 and 54 constituting the ejector 58 are in a side by side, contiguous relation, an intermediate, upstanding portion indicated by the numeral 66 diverges apart at its upper end to receive therebetween a guard 68 pivotally supported by said upstanding portion 66 by means of a pivot pin 70. For the purpose of limiting pivotal movement of the guard 68 in a clockwise direction, as viewed in Figures 2, 4, 5 and 6, a stop 72 is employed, the stop being so disposed that the tip of the guard element will be adjacent the free end of the hook leg 24 when the arm 12 is in a non-releasing position. In order to bias the guard element 68 against the stop 72, a coil spring 74 is circumposed about the pin 70, having one end engaging the underside of the guard 68 and its other end engaging the stop 72. Since the guard element 68 is designed with sufficient length to bridge the entrance of the hook 16, it will be seen that the hook is effectively closed and will prevent the release of any ring, link or similar member contained within said hook when the lever arm 12 is in the position shown in Figure 4.

While normally the load imposed upon any member restrained by the hook 16 will be in such a direction as to be borne by the hook itself, should the load ever be applied in a manner that it is imposed laterally on the guard 68, provision is made in the present invention for preventing lateral deflection of the guard. To this end a projecting tip or boss 76 is provided on the free end of the guard 68 of the proper width and length to extend into the slot 34, when the lever arm 12 is in the position shown in Figures 1, 2 and 4, and therefore any deflective force is resisted by the opposed inner sides of the hook 16. In this way, it will be seen that both ends of the guard 68 are adequately supported laterally, for the other or pivotally connected end is contained within the confines of the upstanding portion or post 66 which is in turn restrained against lateral deflection by the sides of the shank 36.

In order to manipulate the release lever arm 12, an elongated handle piece 80 is included as a part thereof, the handle piece being equipped with a pair of upstanding ears 82 at one end which are riveted to the upstanding portion 66 at 57. Adjacent the other end of the finger piece is a second pair of upstanding ears 84 provided with finger grips 86 having knurled sections 88, the upstanding ears 84 and finger grips 86 having aligned apertures 90 so that the apertures in the ears 84 can be used for engaging both the ball member 46 and the rounded head of the capscrew 50, as best viewed in Figure 3, to retain the lever arm 12 in its closed position, that is, with the guard 68 in bridging relation with the entrance to the hook 16 (Figures 2 and 4).

Rigidity of the lever arm 12 is augmented by equipping the parts 52 and 54 with downwardly extending legs 92 having outturned extremities 94. These outturned extremities are held tightly against the upper side of the shank of the finger piece by a third set of ears 96 which are bent or crimped over the outturned extremities 94, this third set of ears lying intermediate the other two pairs 82 and 84.

While a suitable coil spring might be employed in urging the lever arm 12 into closed position, for the purpose of illustration a flat, composite leaf spring 98 is utilized in the present instance, the spring being anchored at one end within the slot 34 by a cross pin 100 and restrained at its opposite end by virtue of a notch 102 in the parts 52 and 54 at a locus offset from the axis of the pivot pin 14. In this way, an effective moment arm is provided, and the lever arm 12 is constantly biased into closed position, that is, counterclockwise as viewed in Figure 4.

In use, it will be understood that any ring, link or other member to be engaged in the hook 16 may be inserted by merely pressing the member against the guard 68 when the release level arm 12 is in the position depicted in Figures 2 and 4, the spring 74 permitting the guard to yield or pivot in a counterclockwise direction. Accordingly, it will be appreciated that the lever arm 12 need not be pivoted about its pivot 14 to accomplish such action. On the other hand, when the element engaged by the hook 16 is to be released, the panels 86 are merely gripped between one's fingers and the lever arm 12 moved from the position shown in Figure 4 through the transitional stage of Figure 5 until the position of Figure 6 is reached, whereat the element will be completely forced out of the hook 16 by the ejector 58.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim:

1. An ejector snap hook comprising a body member provided at one end with means for attachment to a harness and the like and at the other end with a hook comprising a shank and a curved nose, an elongated handle pivotally connected to the shank at a locus approximately opposite the end of the nose and movable between a first position alongside said shank and a second angularly related position, and an ejector extending from the handle and movable therewith to eject an element received in said hook during pivoting of the handle out of said first position and relative to the body member, said ejector being disposed in registry with said nose in the first position of said handle and extending between the end of the nose and the shank in the second position of the handle.

2. An ejector snap hook comprising a body member provided at one end with means for attachment to a harness and the like and at the other end with a hook including a shank and a curved nose connected thereto, a release member received within said body member for movement relative thereto having an ejector pivotally connected to said shank at a locus approximately opposite the end of said nose, said ejector being movable between a first position in registry with said nose and a second position extending between the end of said nose and the shank, said ejector having an elongated handle for pivoting said ejector from its first to its second position, said handle being disposed alongside the shank of the hook in the first position of said ejector, and a pivoted guard on said release member closing the mouth of said hook in the first position of said ejector.

3. An ejector snap hook comprising a body member provided at one end with a hook portion adapted to receive a connector element, an elongated handle pivotally mounted on said body member and movable between a first position alongside the body member on the side thereof generally opposite the distal end of the hook portion and a second angularly related position, and an ejector extending from the handle and movable therewith, said ejector being provided with a pair of angularly related cam edges sequentially engageable with an element received in the hook during pivoting of the handle to move the element first generally longitudinally of the body member toward the distal end of said hook portion and then generally laterally of said body member and over said distal end.

4. An ejector snap hook comprising a body member provided at one end with a hook having an inner curvature and a curved outer peripheral portion next adjacent the distal end thereof, said hook being adapted to receive a connector element, a release member pivotally mounted on said body member, a handle for said release member movable therewith between a first position alongside said body member on the side thereof generally opposite said distal end and a second angularly related position, and an ejector lever extending from said release member for movement therewith, said ejector lever having a first cam edge initially engageable with an element received by said hook during initial pivoting of the handle out of said first position and disposed generally alongside the inner curvature of said hook in said first position of the handle, said ejector lever further having a second cam edge extending from one end of said first cam edge inwardly of the lever and toward the free end thereof, said second cam edge being initially engageable with the element at an intermediate pivoted position of the handle and extending in a direction generally tangential to said curved outer peripheral portion of said hook next adjacent the distal end thereof in said second position of the handle.

5. An ejector snap hook comprising a body member provided with a hook portion at one end having an inner curvature, said hook being adapted to receive a connector element, a release member having an ejector portion pivotally mounted on said body member at a point generally opposite the distal end of said hook portion and movable between a first position wherein said ejector portion is disposed generally alongside the inner curvature of said hook portion and a second position wherein said ejector portion extends toward the distal end of the hook portion, said ejector portion having a pair of angularly related cam edges sequentially engageable with an element received by said hook portion during pivoting of said release member to move the element first generally longitudinally of the body member toward the distal end of said hook portion and then generally laterally of said body member and over said distal end, and a guard on said release member mounted for movement therewith and relative thereto and closing the mouth of said hook in said first position of said release member.

6. An ejector snap hook comprising a body member provided at one end with a hook having a curved outer peripheral portion next adjacent the distal end thereof, said hook being adapted to receive a connector element and a release member pivotally mounted on said body member and having an ejector extending therefrom for movement therewith between a first and a second position, said ejector being provided with a pair of angularly related cam edges, one of said cam edges being disposed for engagement with an element received by said hook during initial pivoting of the ejector, the other of said cam edges being disposed for initial engagement with the element at an intermediate pivoted position of said ejector, said other of said cam edges extending generally in a direction tangentially of said curved outer peripheral portion next adjacent the distal end of the hook in said second position of the ejector, a pivoted guard on said release member mounted to close the mouth of said hook in said first position of the ejector, and a spring urging said guard toward mouth closing position.

7. An ejector snap hook comprising a body member having means at one end for attachment to a harness and the like and having a hook portion at its other end, said hook being adapted to receive a connector element said body member being provided with an internal recess, a release member pivotally mounted on said body member within said recess and having an ejector extending therefrom and receivable within said recess, said ejector being provided with a pair of cam edges sequentially engageable with an element received in said hook during pivoting of the release member to effect movement of the element first in a direction generally toward said one end of the body member and then in a direction generally laterally of the body member and over the distal end of said hook portion, a handle extending from said release member externally of said body and having a pair of up-turned ears disposed on opposite sides respectively of said body member, said handle being movable between a first position alongside said body member generally opposite the distal end of said hook portion and a second angularly related position, and cooperating means on said handle and body to yieldably retain said handle in said first position.

8. An ejector snap hook comprising a body member provided with a hook portion at one end adapted to receive a connector element, a release member pivotally mounted on said body member for movement between two angularly related positions, an ejector extending from said release member and having a pair of angularly related cam edges sequentially engageable with an element received in said hook during pivoting of said release member to effect movement of the element initially in a direction generally longitudinally of said body member toward the distal end of said hook portion and subsequently generally laterally of said body member and over said distal end, a handle on said release member for movement thereof, a guard pivotally mounted on said release member in spaced relation to said ejector and movable with the release member between a position closing the entrance to said hook and a position removed from the entrance to said hook, a stop on the release member engageable by said guard to limit pivoting of the guard relative to the release member in one direction, and a spring urging said guard in said one direction.

References Cited in the file of this patent

UNITED STATES PATENTS

| | | |
|---|---|---|
| 443,630 | Adams | Dec. 30, 1890 |
| 499,942 | Sloan | June 20, 1893 |
| 527,286 | Perkins | Oct. 9, 1894 |
| 628,619 | Alwood | July 11, 1899 |
| 829,777 | Gonce | Aug. 28, 1906 |
| 1,159,472 | Christofferson | Nov. 9, 1915 |
| 1,376,278 | Hokanson | Apr. 26, 1921 |
| 1,427,848 | Rankin | Sept. 5, 1922 |
| 1,455,545 | Monahan | May 15, 1923 |
| 1,622,971 | Porter | Mar. 29, 1927 |